United States Patent
Lee et al.

(10) Patent No.: US 9,468,034 B2
(45) Date of Patent: Oct. 11, 2016

(54) METHOD FOR DETECTING COVERAGE LOSS IN BROADBAND WIRELESS ACCESS SYSTEM

(75) Inventors: Jin Lee, Anayng-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 605 days.

(21) Appl. No.: 12/870,510

(22) Filed: Aug. 27, 2010

(65) Prior Publication Data

US 2011/0223905 A1   Sep. 15, 2011

Related U.S. Application Data

(60) Provisional application No. 61/294,098, filed on Jan. 11, 2010, provisional application No. 61/238,640, filed on Aug. 31, 2009, provisional application No. 61/240,641, filed on Sep. 8, 2009, provisional application No. 61/237,662, filed on Aug. 27, 2009.

(30) Foreign Application Priority Data

Mar. 9, 2010 (KR) .......................... 10-2010-0020741

(51) Int. Cl.
   *H04W 24/08* (2009.01)
   *H04W 76/02* (2009.01)

(52) U.S. Cl.
   CPC .................... *H04W 76/028* (2013.01)

(58) Field of Classification Search
   CPC ............................ H04W 24/00; H04W 24/08
   USPC .................................................. 455/423, 424
   See application file for complete search history.

(56) References Cited

U.S. PATENT DOCUMENTS

2006/0030305 A1*  2/2006  Lee et al. ................. 455/418
2007/0155378 A1   7/2007  Lee et al.
(Continued)

FOREIGN PATENT DOCUMENTS

CN      101036411       9/2007
KR      1020050089697   9/2005
(Continued)

OTHER PUBLICATIONS

Part 16: Air Interface for Fixed and Mobile Broadband Wireless Access Systems, IEEE P802.16m/D4, Feb. 3, 2010.*
(Continued)

*Primary Examiner* — Christopher M Brandt
(74) *Attorney, Agent, or Firm* — Lee, Hong, Degerman, Kang & Waimey; Jonathan Kang; Harry Lee

(57) ABSTRACT

A method for detecting coverage loss in a broadband wireless access system is disclosed, which recognizes a connection state between a mobile station (MS) and a base station (BS), and provides a method and apparatus for quickly performing network re-entry when the MS moves out of a coverage area of the BS. A method for allowing a base station to perform coverage loss detection of a mobile station in a broadband wireless access system includes unsolicitedly transmitting a first message wherein a bit for requesting ranging execution is set, to the mobile station, and upon receiving a second message for confirming the ranging from the mobile station prior to expiration of a first timer that begins to operate when the first message is transmitted, restarting operating a second timer established for the mobile station.

10 Claims, 13 Drawing Sheets

(56) References Cited

U.S. PATENT DOCUMENTS

| | | | | |
|---|---|---|---|---|
| 2007/0232339 A1* | 10/2007 | Ji et al. | ......................... | 455/502 |
| 2007/0258407 A1* | 11/2007 | Li et al. | ......................... | 370/331 |
| 2008/0031182 A1* | 2/2008 | Maheshwari et al. | ........ | 370/320 |
| 2008/0310384 A1 | 12/2008 | Shim et al. | | |
| 2010/0067476 A1* | 3/2010 | Periyalwar et al. | .......... | 370/329 |
| 2011/0026455 A1* | 2/2011 | Liu et al. | ...................... | 370/328 |
| 2011/0255502 A1* | 10/2011 | Shen et al. | ................... | 370/329 |

FOREIGN PATENT DOCUMENTS

| | | |
|---|---|---|
| KR | 1020060097506 | 9/2006 |
| WO | 2006/062285 | 6/2006 |
| WO | 2009/045018 | 4/2009 |

OTHER PUBLICATIONS

IEEE Std 802.16e-2005 Part 16:Air Interface for Fixed and Mobile Broadband Wireless Access Systems Amendment 2:Physical and Medium Access COntrol Layers for combined Fixed and Mobile Operation in Licensed Bands and Cerrigendum 1 (Feb. 28, 2006).*

The State Intellectual Property Office of the People's Republic of China Application Serial No. 201080044738.8, Office Action dated Jan. 24, 2014, 5 pages.

European Patent Office Application No. 10812302.7, Search Report dated Jul. 12, 2016, 8 pages.

* cited by examiner

METHOD FOR DETECTING COVERAGE LOSS IN BROADBAND WIRELESS ACCESS SYSTEM

CROSS REFERENCE TO RELATED APPLICATIONS

Pursuant to 35 U.S.C. §119, this application claims the benefit of earlier filing date and right of priority to Korean Patent Application No. 10-2010-0020741, filed on Mar. 9, 2010, and also claims the benefit of U.S. Provisional Application Ser. No. 61/294,098, filed on Jan. 11, 2010, 61/240, 641, filed on Sep. 8, 2009, 61/238,640, filed on Aug. 31, 2009, and 61/237,662, filed on Aug. 27, 2009, the contents of which are all incorporated by reference herein in their entirety.

BACKGROUND OF THE INVENTION

1. Field of the Invention

The present invention relates to a broadband wireless access system, and more particularly to a method for recognizing a connection state between a mobile station (MS) and a base station (BS), and a method and apparatus for quickly performing network re-entry when the mobile station (MS) moves out of a coverage area of the base station (BS).

2. Discussion of the Related Art

In a general mobile communication system, uplink (UL) data may not be unexpectedly received from a mobile station (MS) during a predetermined period of time, or a feedback signal (ACK or NACK signal) for downlink (DL) data may not be unexpectedly transmitted to a base station (BS).

In this case, the BS performs triggering of a resource retain timer, and stores context information of the MS during the triggering time, such that the MS can easily perform network re-entry. The aforementioned method is implicitly provided from a general mobile communication system. In reality, a specific time or reference at which the MS moves out of a network area (i.e., coverage area) is unclear, such that it is necessary for the BS must unnecessarily to store context information of the MS.

That is, in accordance with a general technology, if the MS moves out of a coverage zone of a serving BS (SBS), there is a difference in synchronization between the SBS and the MS. However, behaviors between the MS and the SBS are not definitely defined yet. In addition, the general or conventional technology does not provide a method for allowing the SBS to decide the presence or absence of a coverage loss of the MS.

SUMMARY OF THE INVENTION

Accordingly, the present invention is directed to a method for detecting coverage loss in a broadband wireless access system that substantially obviates one or more problems due to limitations and disadvantages of the related art.

An object of the present invention is to provide a method for detecting coverage loss of a mobile station (MS) such that a base station can effectively determine whether the MS is present in a coverage area of the BS.

Another object of the present invention is to provide a method for allowing a mobile station (MS) to effectively determine whether the MS is present in a coverage area of a serving base station (SBS), and a method and apparatus for detecting coverage loss of the MS such that the MS can quickly perform initial network entry or network re-entry even though the MS moves out of the coverage area of the SBS.

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for allowing a base station to perform coverage loss detection of a mobile station in a broadband wireless access system includes unsolicitedly transmitting a first message wherein a bit for requesting ranging execution is set, to the mobile station; and upon receiving a second message for confirming the ranging from the mobile station prior to expiration of a first timer that begins to operate when the first message is transmitted, restarting operating a second timer established for the mobile station.

The transmitting of the first message may be performed after expiration of the second timer. Until reaching a specific time after completion of a connected state with the mobile station or after completion of handover from the mobile station to a second base station, if a handover completion notification message is not received from the second base station, the second timer may start operation, and be updated when data or feedback information is received from the mobile station.

The method may further include, when the second timer expires, allocating uplink resources to the mobile station a predetermined number of times, and the transmitting of the first message may be performed when a predetermined protocol data unit (PDU) is not received from the mobile station through the uplink resources.

The method may further include, if the second message is not received from the mobile station until the first timer expires, starting operating a third timer that indicates a retention period of context information of the mobile station.

The method may further include upon receiving no context information of the mobile station from a different network entity prior to expiration of the third timer, releasing the context information of the mobile station.

The first message may be an unsolicited advanced air interface (AAI) ranging response (unsolicited AAI_RNG-RSP) message, the bit for requesting ranging execution may be a ranging request bit, and the second message may be an advanced air interface ranging confirmation (AAI_RNG-CFM) message.

The AAI_RNG-CFM message may include a station ID of the mobile station.

The first timer may be a T58 timer, the second timer may be an active base station timer (Active_ABS_timer), and the third timer may be a resource retain timer.

The ranging may be a periodic ranging.

In another aspect of the present invention, a method for allowing a mobile station to perform coverage loss detection in a broadband wireless access system includes receiving an unsolicited first message wherein a first bit for requesting ranging execution is set from a serving base station; performing ranging for the base station; and transmitting a second message for confirming the ranging to the serving base station.

The performing of the ranging may include transmitting a periodic ranging code to the base station; and receiving an advanced air interface ranging acknowledgement (AAI_RNG-ACK) message indicating a success or failure of the transmitted code.

The method may further include requesting uplink resources for transmitting the second message from the base station, wherein the second message includes a station ID (STID) of the mobile station.

The method may further include performing initial network entry or network re-entry to a detected base station when there is a failure in transmission of the second message.

The performing of the network re-entry may include transmitting a third message to the detected base station, wherein the third message includes not only an identifier associated with context information retention of the mobile station but also a second bit for indicating network re-entry after coverage loss.

The unsolicited first message may be an unsolicited advanced air interface ranging response (unsolicited AAI_RNG-RSP) message, the first bit may be a ranging request bit, the second message may be an advanced air interface ranging confirmation (AAI_RNG-CFM) message, the second bit may be a 'bit 5' of a ranging purpose indicator field, the third message may be an advanced air interface ranging request (AAI_RNG-REQ) message, and an identifier associated with the context information retention may be a context retention identifier (CRID).

In another aspect of the present invention, a mobile station for operating in a broadband wireless access system includes a processor; and a radio frequency (RF) module that transmits and receives an RF signal to and from an external part upon receiving a control signal from the processor, wherein the processor receives an unsolicited first message wherein a first bit for requesting ranging execution is set from a serving base station by controlling the RF module, performs ranging for the base station, and transmits a second message for confirming the ranging to the serving base station.

The processor may transmit a periodic ranging code to the base station, and receive an advanced air interface ranging acknowledgement (AAI_RNG-ACK) message indicating a success or failure of the transmitted code.

The processor may request uplink resources transmitting the second message from the base station. If the uplink resources are allocated, the processor may transmit the second message through the allocated uplink resources, wherein the second message includes a station ID (STID) of the mobile station.

The processor may perform initial network entry or network re-entry to a detected base station when the second message fails to be transmitted, and the network re-entry may be performed by transmitting a third message to the detected base station, wherein the third message includes not only an identifier associated with context information retention of the mobile station but also a second bit for indicating network re-entry after coverage loss.

The unsolicited first message may be an unsolicited advanced air interface ranging response (unsolicited AAI_RNG-RSP) message, the first bit may be a ranging request bit, the second message may be an advanced air interface ranging confirmation (AAI_RNG-CFM) message, the second bit may be a 'bit 5' of a ranging purpose indicator field, the third message may be an advanced air interface ranging request (AAI_RNG-REQ) message, and an identifier associated with the context information retention may be a context retention identifier (CRID).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Figure 1:
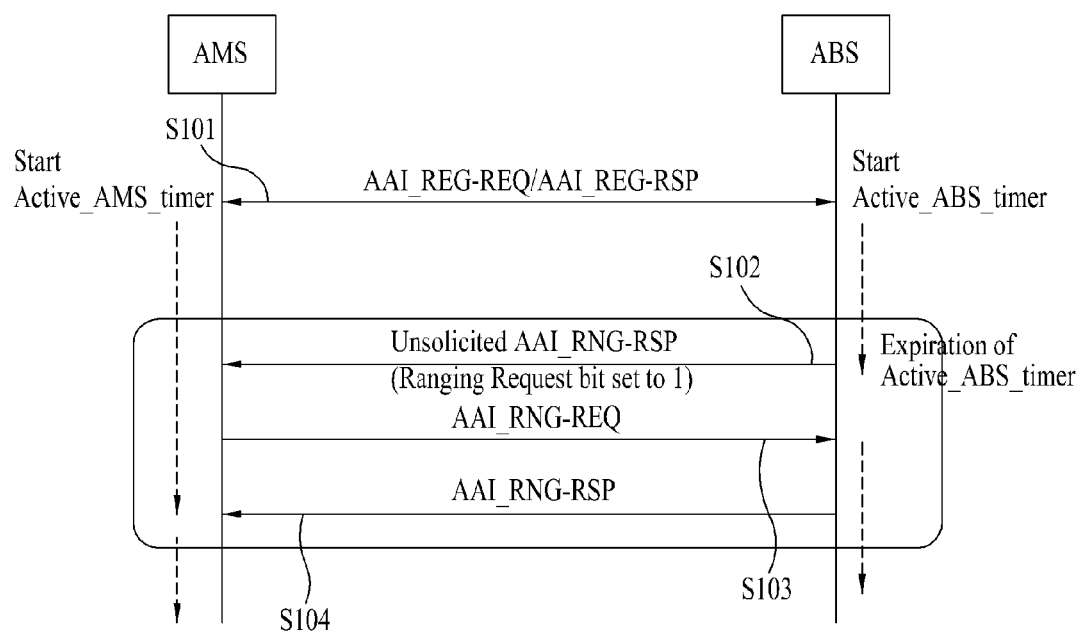
FIG. 1 is a conceptual diagram illustrating one exemplary method for detecting coverage loss according to one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

Embodiments of the present invention provide a wireless access system.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions or features of any one embodiment may be included in another embodiment and may be replaced with corresponding constructions or features of another embodiment.

In the description of drawings, procedures or steps, which may confuse the substance of the present invention, are not explained. Additionally, procedures or steps, which can be understood by those skilled in the art, are not explained as well.

In exemplary embodiments of the present invention, a description is made of a data transmission and reception relationship between a base station (BS) and a Mobile Station (MS). Herein, the term 'BS' refers to a terminal node of a network, which communicates directly with the mobile station (MS). In some cases, a specific operation described as performed by the base station (BS) may be performed by an upper node of the base station (BS).

Namely, it is apparent that, in a network comprised of a plurality of network nodes including a base station (BS), various operations performed for communication with a mobile station (MS) may be performed by the base station (BS), or network nodes other than the base station (BS). The term 'BS' may be replaced with the term 'fixed station', 'Node B', 'eNode B (eNB)', 'access point', 'Advanced Base Station (ABS), etc. The term 'MS' may be replaced with the term 'User Equipment (UE)', 'Mobile Subscriber Station (MSS)', 'mobile terminal', 'Advanced Mobile Station (AMS)' or 'Subscriber Station (SS)', etc.

A transmitter means a node that transmits voice or data service and a receiver means a node that receives voice or data service. Hence, an MS may be a transmitter and a BS may be a receiver, on an uplink. Likewise, the MS may be a receiver and the BS may be a transmitter, on a downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc.

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of P802.16-2004, P802.16e-2005, P802.16Rev2 and IEEE 802.16m documents which are the standards of IEEE 802.16.

Specific terms used for the exemplary embodiments of the present invention are provided to aid in understanding of the present invention. These specific terms may be replaced with other terms within the scope and spirit of the present invention.

For convenience of description and better understanding of the present invention, it is assumed that a system for use in the embodiments of the present invention is an IEEE 802.16m system. In particular, the present invention assumes that an MS to be described hereinafter is an advanced mobile station (AMS) and a BS to be described hereinafter is an advanced base station (ABS).

For convenience of description and better understanding of the present invention, Term 'Coverage Loss' will hereinafter be defined in detail.

Coverage loss means that temporary signal loss occurs because an MS moves out of a service area (i.e., coverage area) of a BS and the signal fading occurs.

Next, an active ABS timer (active_ABS_timer) will hereinafter be defined.

The active ABS timer (active_ABS_timer) is maintained for each AMS by the ABS. The active ABS timer (active_ABS_timer) may start operation upon completion of initial network entry caused by completion of the exchange of AAI_REQ-REQ/AAI_REG-RSP messages between the ABS and the AMS. Otherwise, the active ABS timer may start operation upon completion of network re-entry caused by handover (HO) process optimization contained in an advanced air interface ranging response (AAI_RNG-RSP) message. The active ABS timer (active_ABS_timer) may be reset when the ABS receives data from the AMS. For example, the data may be a Medium Access Control Protocol Data Unit (MAC PDU) or feedback information.

In another case wherein the active ABS timer (active_ABS_timer) starts operation, when an AMS that uses a corresponding ABS as a serving ABS is handed over to another target ABS, or when the corresponding ABS does not receive HO completion notification from a network through a backbone network until reaching a predetermined time point, the active ABS timer (active_ABS_timer) may start operation. In this case, it is preferable that the predetermined time point be set to a specific time indicated by ranging initiation deadline (Ranging_Initiation_Deadline) information.

Hereinafter, a resource retain timer will be defined in detail.

If the active ABS timer (active_ABS_timer) of a specific AMS is expired, the ABS enters a predetermined procedure for determining whether the corresponding AMS is in coverage loss. For convenience of description, the predetermined procedure is called a 'Coverage Loss Detection'. Detailed description of the coverage loss detection operation will be described later.

In the case where there is no response from the AMS upon completion of the aforementioned procedure, the ABS may start operating the resource retain timer. If the resource retain timer is expired, the ABS may release context information of the corresponding AMS.

In addition, the active AMS timer (Active_AMS_Timer) will hereinafter be described.

In the same manner as in the aforementioned active ABS timer (active_ABS_timer), the AMS may start operating the active AMS timer (active_ABS_timer) upon completion of initial network entry caused by completion of the exchange of AAI_REG-REQ/AAI_REG-RSP messages between the AMS and the ABS. Otherwise, the active ABS timer may start operation upon completion of network re-entry caused by HO process optimization contained in an advanced air interface ranging response (AAI_RNG-RSP) message. During the retaining time of an active AMS timer (active_AMS_timer) (i.e., before the expiration of the active AMS timer), the AMS can recognize that its own context information is maintained over a network.

Next, methods for detecting coverage loss of an AMS and an ABS using the aforementioned defined timers according to the embodiments of the present invention will hereinafter be described in detail.

First Embodiment

In accordance with one embodiment of the present invention, a method for detecting coverage loss such that an ABS is initiated will hereinafter be described in detail.

FIG. 1 is a conceptual diagram illustrating one exemplary method for detecting coverage loss according to one embodiment of the present invention.

Referring to FIG. 1, the AMS and the ABS may complete a network re-entry procedure of the AMS by exchanging the AAI_REQ-REQ/AAI_REQ-RSP messages, such that the AMS may start operating the active AMS timer (active_ABS_timer) and the ABS may start operating the active ABS timer (active_ABS_timer) for the corresponding AMS at step S101.

In this case, a context retention identifier (CRID) may be allocated to the AMS through an AAI registration response (AAI_REG-RSP) message. The CRID may be adapted to identify the corresponding AMS at an entity (e.g., Authenticator ASN-GW) that maintains context information of the ABS or the corresponding AMS on the network. In addition, CRID may also be used to identify the AMS that operates in a Deregistration with Context Retention (DCR) mode. Such CRID may be allocated to the AMS through the AAI_REG-RSP message. If the AMS performs network re-entry, the CRID may be updated through an AAI ranging response (AAI_RNG-RSP) message. Otherwise, if the AMS enters a DCR mode, the CRID may also be updated through an AAI deregistration response (AAI_DREF-RSP) message.

After that, if the ABS continuously receives no data from the AMS until the active ABS timer (active_ABS_timer) of the ABS expires, the ABS may transmit an unsolicited AAI_RNG-RSP message to the AMS such that it can allocate an uplink (UL) band to the AMS or ask the AMS to perform the ranging at step S102.

In this case, if the ABS transmits the unsolicited AAI_RNG-RSP message to the AMS, in order to inform the AMS of the ranging request, the ABS may set a ranging request bit of the AAI_RNG-RSP message to '1'.

As a response to the AAI_RNG-RSP message, the AMS may transmit an AAI ranging request (AAI_RNG-REQ) message to the ABS at step S103.

Therefore, the active ABS timer (active_ABS_timer) of the corresponding AMS may be reset, and the ABS may transmit the AAI_RNG-RSP message to the AMS in response to the AAI_RNG-REQ message at step S104. The AMS receives the AAI_RNG-RSP message, such that it can reset its own active AMS timer (active_AMS_timer).

Figure 2:
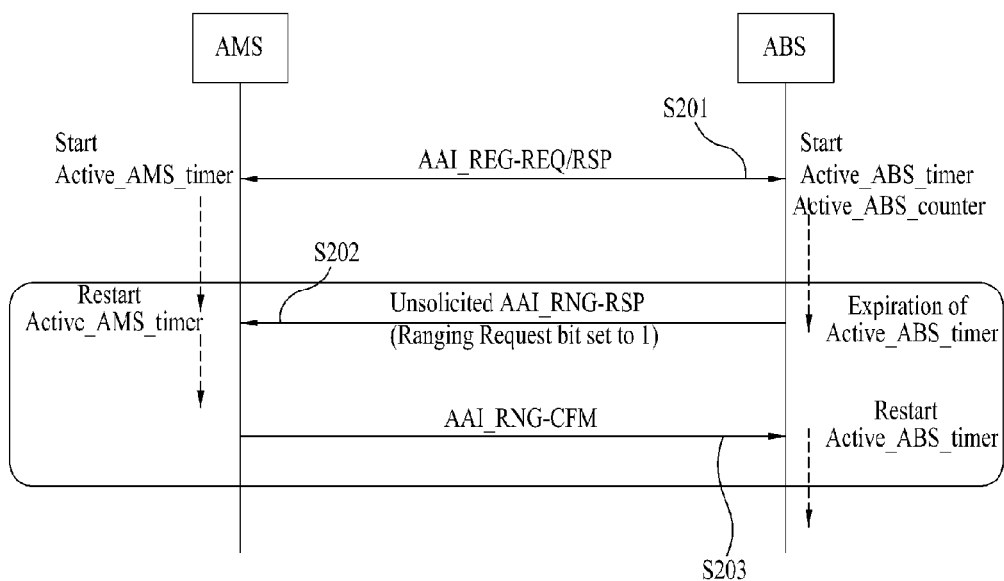
FIG. 2 is a conceptual diagram illustrating another exemplary method for detecting coverage loss according to one embodiment of the present invention.

FIG. 2 is a conceptual diagram illustrating another exemplary method for detecting coverage loss according to one embodiment of the present invention.

Referring to FIG. 2, steps S201 and S202 are respectively similar to steps S101 and S102, and as such detailed description thereof will herein be omitted for convenience of description.

The AMS of FIG. 2 resets its own timer when receiving an unsolicited AAI_RNG-RSP message, whereas the AMS of FIG. 1 has reset its own timer when receiving the AAI_RNG-RSP message as a response to the AAI_RNG-REQ message.

In addition, the AMS of FIG. 2 transmits an AAI ranging confirmation (AAI_RNG-CFM) message as a response to the unsolicited AAI_RNG-RSP message to the ABS at step S203, whereas the AMS of FIG. 1 transmits the AAI_RNG-REQ message as a response to the unsolicited AAI_RNG-RSP message to the ABS at step S103. The ABS having received the AAI_RNG-CFM message may reset the active ABS timer (active_ABS_timer) of the corresponding AMS.

Figure 3:
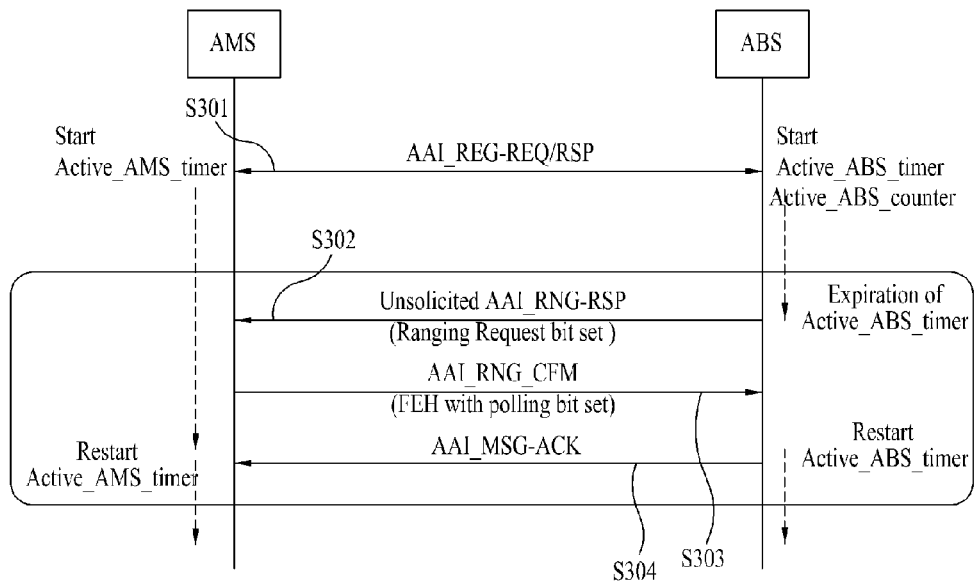
FIG. 3 is a conceptual diagram illustrating still another exemplary method for detecting coverage loss according to one embodiment of the present invention.

FIG. 3 is a conceptual diagram illustrating still another exemplary method for detecting coverage loss according to one embodiment of the present invention.

Referring to FIG. 3, steps S301 to S303 are respectively similar to steps S201 to S203 of FIG. 2, and as such detailed description thereof will herein be omitted for convenience of description.

In contrast to FIG. 2, the AMS receives the unsolicited AAI_RNG-RSP message from the ABS and updates the active AMS timer (active_AMS_timer). In step S303 of FIG. 3, a feedback extended header (FEH) wherein a polling bit is set is contained in the AAI_RNG-CFM message, such that the resultant AAI_RNG-CFM message including the FEH is transmitted to the ABS. Upon receiving an AAI message acknowledgement (AAI_MSG-ACK) message from the ABS in response to the resultant AAI_RNG-CFM message, the AMS updates the active AMS timer (active_AMS_timer) at step S304.

In this case, a MAC Control Extended Header (MCEH) may be used instead of the feedback extended header (FEH).

A Station ID (STID) of the corresponding AMS may be further included in the AAI_RNG-CFM message.

Figure 4:
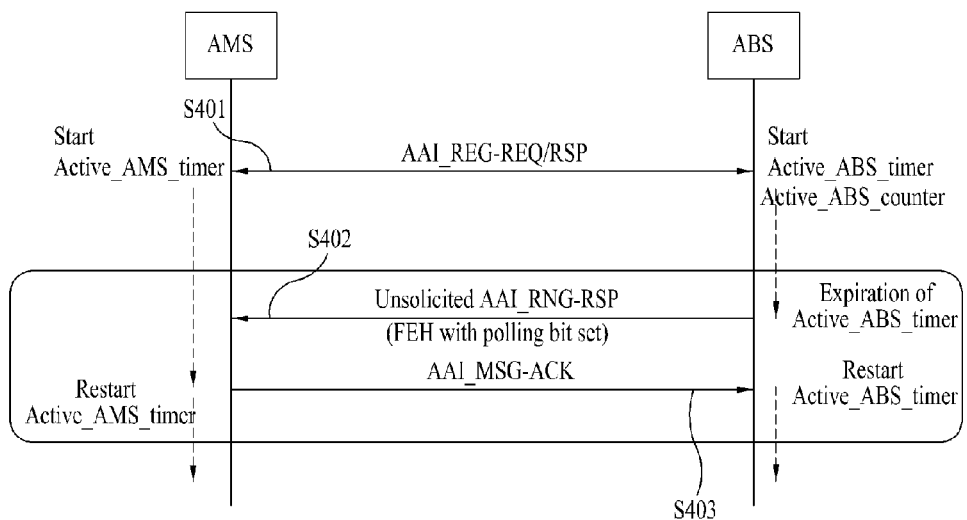
FIG. 4 is a conceptual diagram illustrating still another exemplary method for detecting coverage loss according to one embodiment of the present invention.

FIG. 4 is a conceptual diagram illustrating still another exemplary method for detecting coverage loss according to one embodiment of the present invention.

Referring to FIG. 4, the AMS and the ABS may complete the network entry procedure of the AMS by exchanging the AAI_REG-REQ/AAI_REG-RSP messages with each other, such that the AMS may start operating the active AMS timer (active_AMS_timer) and the ABS may start operating the active ABS timer (active_ABS_timer) at step S401.

After that, if the ABS continuously receives no data from the AMS until the active ABS timer (active_ABS_timer) of the ABS expires, the ABS may transmit an unsolicited AAI_RNG-RSP message to the AMS such that it can allocate an uplink (UL) band to the AMS or ask the AMS to perform the ranging at step S402.

In this case, in order to inform the AMS of the ranging request, the ABS may set a ranging request bit of the AAI_RNG-RSP message to '1', or may set a polling bit of the FEH or MCEH to '1'.

As a response to the unsolicited AAI_RNG-RSP message, the AMS may transmit an AAI message acknowledgement (AAI_MSG-ACK) message to the ABS at step S403. By transmission and reception of the AAI_MSG-ACK message, the ABS and the AMS can simultaneously reset their active timers.

In the aforementioned methods for detecting coverage loss, it is preferable that the ranging that is requested from the AMS through the unsolicited AAI_RNG-RSP message be periodic ranging, such that the AMS may transmit the periodic ranging code instead of the AAI ranging request (AAI_RNG-REQ) message.

Second Embodiment

In accordance with another embodiment of the present invention, an AMS-initiated coverage loss detection method is provided.

Figure 5:
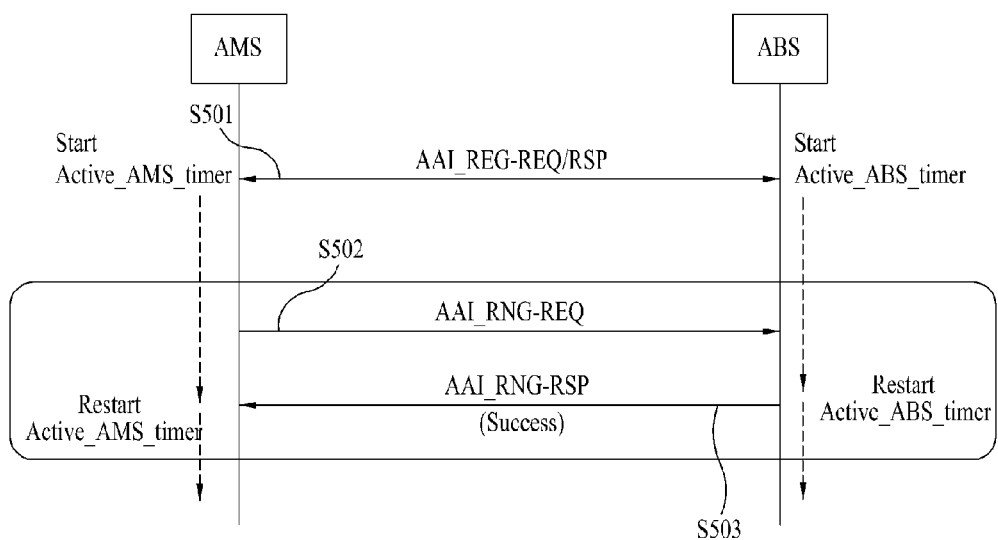
FIG. 5 is a conceptual diagram illustrating a method for detecting coverage loss by an advanced mobile station (AMS) according to another embodiment of the present invention.

FIG. 5 is a conceptual diagram illustrating a method for detecting coverage loss by an AMS according to another embodiment of the present invention.

Referring to FIG. 5, the AMS and the ABS may complete the network entry procedure of the AMS by exchanging the AAI_REQ-REQ/AAI_REQ-RSP messages with each other, such that the AMS may start operating the active AMS timer (active_AMS_timer) and the ABS may start operating the active ABS timer (active_ABS_timer) at step S501.

In this case, the context retention ID (CRID) may be allocated to the AMS through the AAI_REG-RSP message.

The AMS may transmit the AAI_RNG-REQ message to the serving ABS so as to determine whether the AMS is in coverage loss at step S502.

The ABS having received the AAI_RNG-REQ message updates the active ABS timer (active_ABS_timer), and informs the AMS of the successful ranging through the AAI_RNG-RSP message at step S503, such that the AMS can update the active AMS timer (active_AMS_timer).

In accordance with another aspect of the present invention, in the case where the AMS does not transmit a predetermined message to the ABS and does not establish physical (PHY) synchronization and DL synchronization with the ABS, this means that the AMS is in coverage loss.

For example, if the AMS fails to continuously decode as many superframe headers (SFHs) transmitted from the ABS as a predetermined number of SFHs (e.g., 5 SFHs), this means that the AMS is in coverage loss.

Third Embodiment

In accordance with still another embodiment of the present invention, a method for releasing context information of the AMS without using the resource retention timer is provided.

Operations of the ABS will hereinafter be described with reference to FIG. 6.

Figure 6:
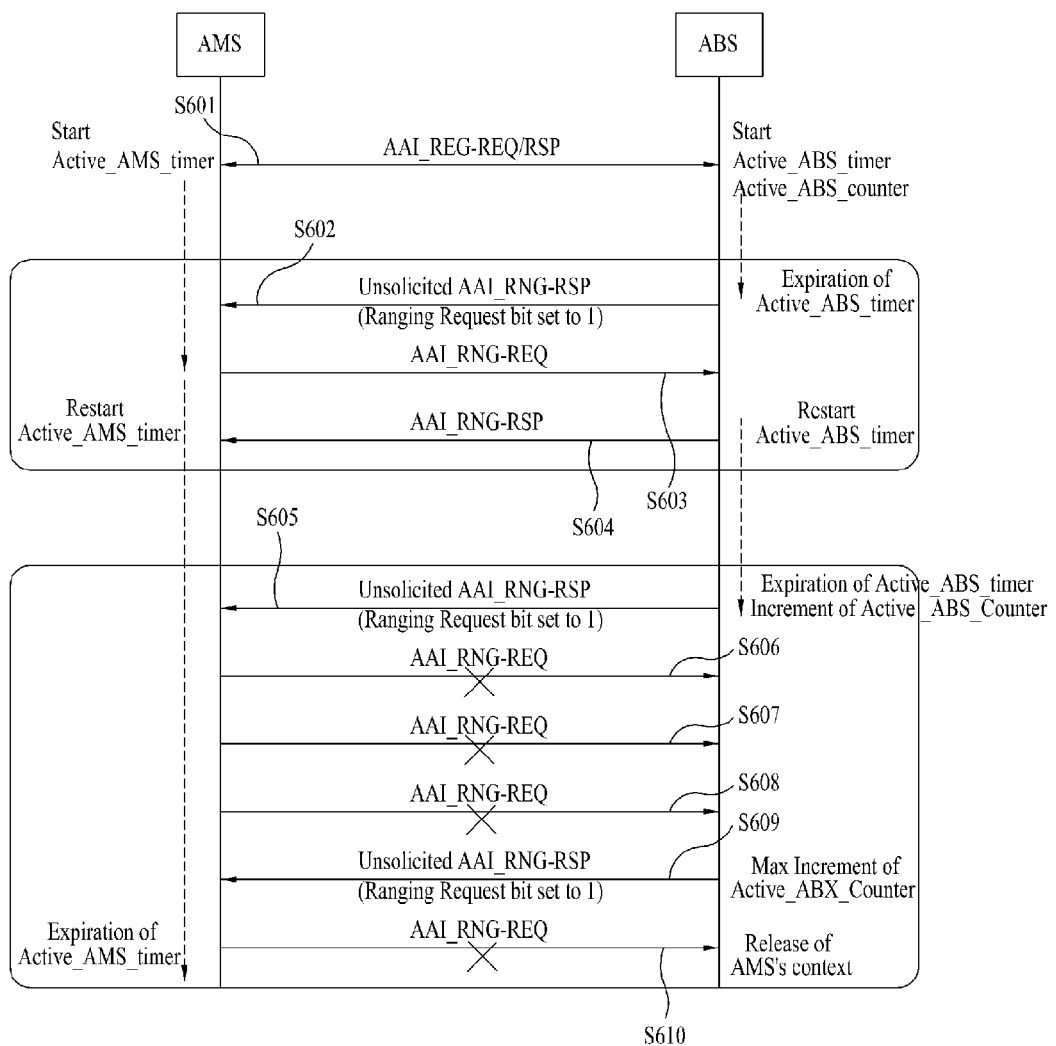
FIG. 6 is a conceptual diagram illustrating a method for releasing AMS context information of an advanced base station (ABS) according to still another embodiment of the present invention.

FIG. 6 is a conceptual diagram illustrating a method for releasing AMS context information of an advanced base station (ABS) according to still another embodiment of the present invention.

Referring to FIG. 6, the AMS and the ABS may complete a network re-entry procedure of the AMS by exchanging the AAI_REQ-REQ/AAI_REQ-RSP messages, such that the AMS may start operating the active AMS timer (active_ABS_timer) and the ABS may start operating the active ABS timer (active_ABS_timer) for the corresponding AMS at step S601.

In this case, the context retention ID (CRID) may be allocated to the AMS through the AAI_REG-RSP message.

If the active ABS timer (active_ABS_timer) for the corresponding AMS has expired at the ABS, the ABS transmits the unsolicited AAI_RNG-RSP message wherein the ranging request bit is set to '1' to the AMS in order to detect the coverage loss at step S602.

Therefore, the AMS and the ABS exchange the AAI_RNG-REQ/AAI_RNG-RSP messages with each other. Upon receiving the AAI_RNG-REQ message, the ABS resets its own active timer (active_ABS_timer) at step S603. Upon receiving the AAI_RNG-RSP message, the AMS resets its own active timer (active_AMS_timer) at step S604.

After that, if the active_ABS_timer for the corresponding AMS has re-expired, the ABS transmits the unsolicited AAI_RNG-RSP message wherein the ranging request bit is set to '1' to the AMS at step S605.

The AMS moves out of the coverage area of the corresponding ABS such that it is unable to receive the unsolicited AAI_RNG-RSP message from the ABS. In addition, although the AMS receives the unsolicited AAI_RNG-RSP message from the ABS and transmits the AAI_RNG-REQ message as a response to the unsolicited AAI_RNG-RSP message to the ABS, the ABS may not receive the AAI_RNG-REQ message (S606 to S608).

If the ABS does not receive a response to the AAI_RNG-RSP message from the AMS, the ABS may retransmit the unsolicited AAI_RNG-RSP message and increase a value of an active ABS counter at step S609.

If the ABS does not receive the AAI_RNG-REQ message from the AMS even though the active ABS counter reaches a predetermined maximum value, the ABS may release the context information of the AMS at step S610.

Operations of the AMS according to the embodiments of the present invention will hereinafter be described with reference to FIG. 7.

Figure 7:
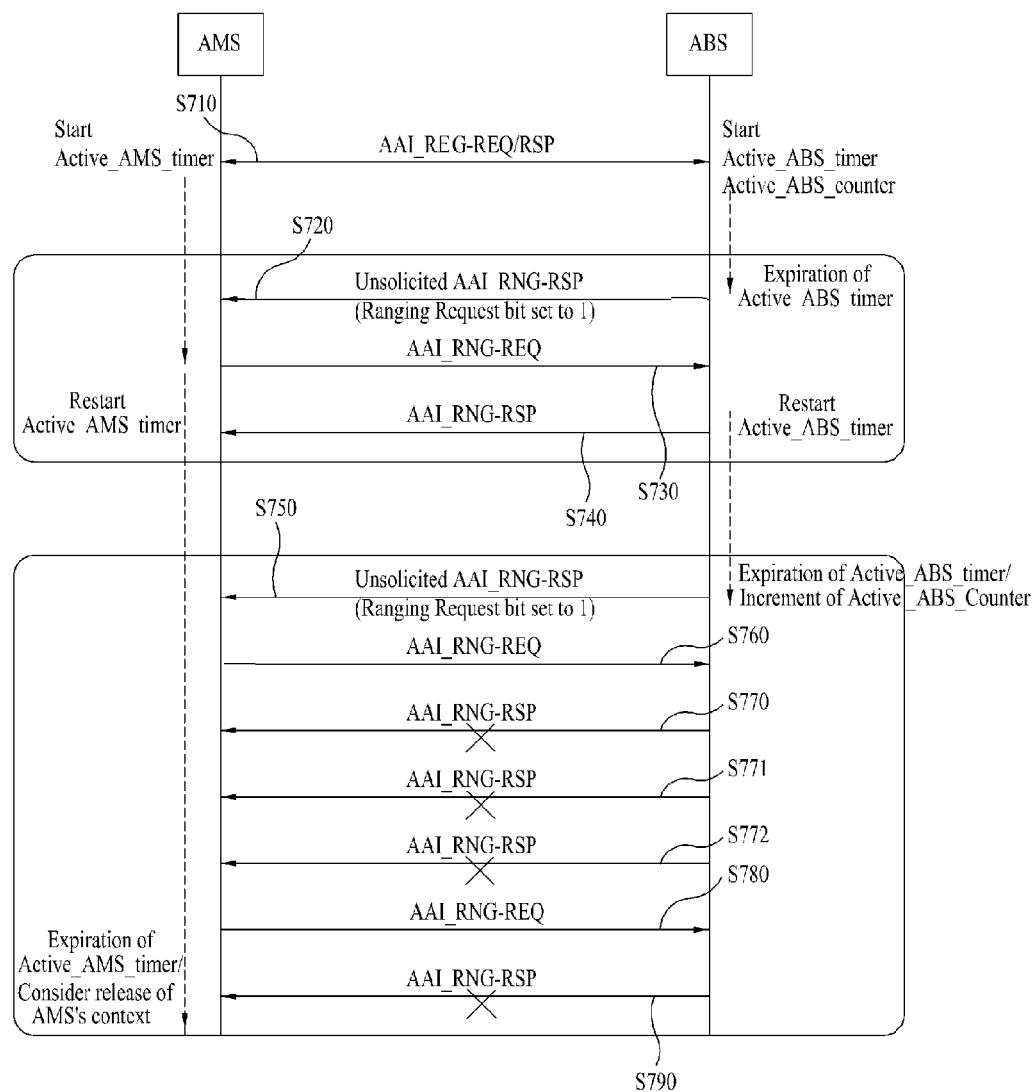
FIG. 7 is a conceptual diagram illustrating a method for releasing AMS context information of an advanced base station (ABS) from the viewpoint of an advanced mobile station (AMS) according to still another embodiment of the present invention.

FIG. 7 is a conceptual diagram illustrating a method for releasing AMS context information of an ABS from the viewpoint of an AMS according to still another embodiment of the present invention.

Referring to FIG. 7, steps S710 to S750 are respectively similar to steps S601 to S605 of FIG. 6, and as such detailed description thereof will herein be omitted for convenience of description.

The AMS receives the unsolicited AAI_RNG-RSP message wherein the ranging request bit is set to '1' from the ABS, and transmits the AAI_RNG-REQ message (or the periodic ranging code) as a response to the unsolicited AAI_RNG-RSP message at step S760.

In this case, the AMS moves out of the coverage area of the corresponding ABS such that it is unable to receive the AAI_RNG-REQ message from the ABS. In addition, although the ABS receives the AAI_RNG-REQ message from the ABS and transmits the AAI_RNG-RSP message as a response to the AAI_RNG-REQ message to the AMS, the AMS may not receive the AAI_RNG-RSP message (S770 to S772).

Therefore, although the AMS transmits the AAI_RNG-REQ message (or the periodic ranging code) to the ABS a predetermined number of times, in the case where the AMS does not continuously receive a response to the AAI_RNG-REQ message (or the periodic ranging code) or the active AMS timer (active_AMS_timer) expires, this means that context information of the AMS is released from the corresponding network.

Meanwhile, in accordance with still another aspect of the present invention, although the ABS receives the HO completion notification message over a backbone network after the AMS is handed over to another network entity, the ABS may release the context information of the corresponding AMS.

Fourth Embodiment

In accordance with still another embodiment of the present invention, a method for allowing the ABS to effectively detect coverage loss of the AMS by combination of the aforementioned embodiments will hereinafter be described in detail.

Figure 8:
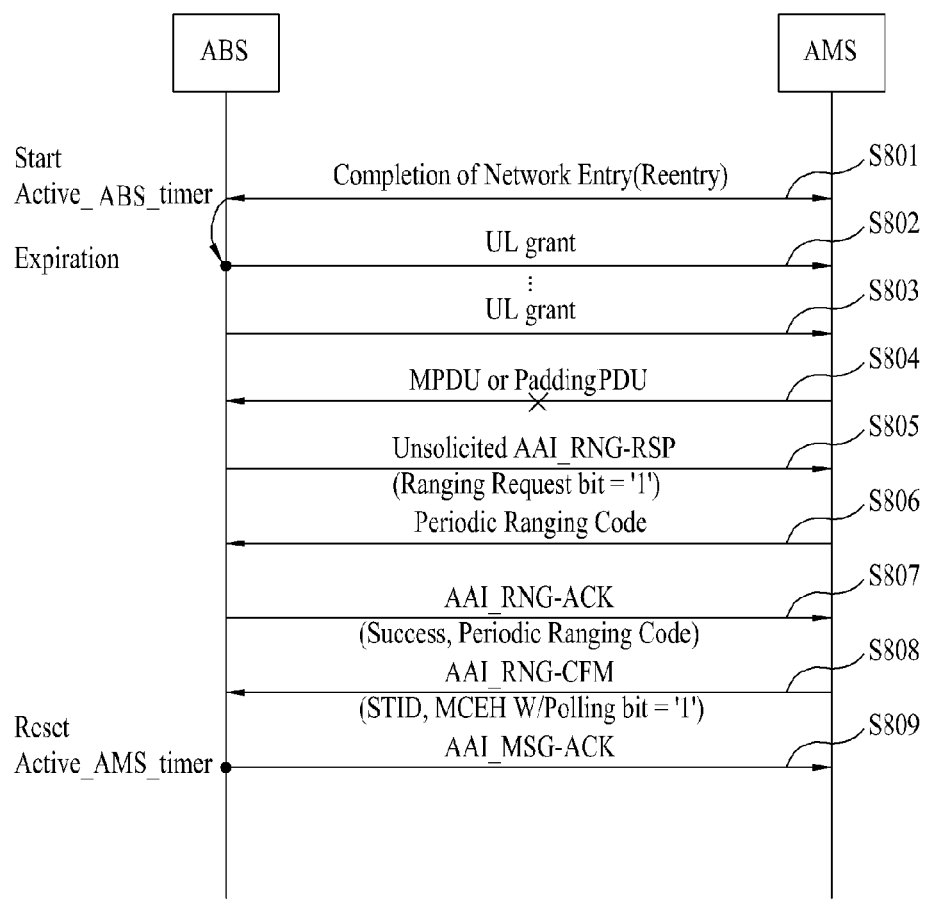
FIG. 8 is a conceptual diagram illustrating a method for detecting coverage loss according to still another embodiment of the present invention.

FIG. 8 is a conceptual diagram illustrating a method for detecting coverage loss according to still another embodiment of the present invention.

First, upon completion of initial network entry of the AMS or upon completion of network re-entry of the AMS, the ABS may start operating the active ABS timer (active_ABS_timer) of the corresponding AMS and the AMS may start operating the active AMS timer (active_AMS_timer) at step S801.

In this case, the initial network entry may be completed by completion of the exchange of the AAI_REG-REQ/AAI_REG-RSP messages, and the completion or non-completion of the network re-entry may be decided in response to HO process optimization contained in the AAI_RNG-RSP message. During the initial network entry, a context retention ID (CRID) may be allocated to the AMS through the AAI_REG-RSP message. During the network re-entry, a new CRID may be allocated to the AMS through the AAI_RNG-RSP message.

In this case, if the active ABS timer (active_ABS_timer) of the corresponding AMS has expired, the ABS may allocate a grant UL burst to check a current status of the corresponding AMS at step S802.

As a response to the grant UL burst, the AMS may transmit a padding PDU or MPDU through UL resources (i.e., UL grant). If the ABS receives the PDU or MPDU from the AMS, the active ABS timer (active_ABS_timer) may be reset.

However, the ABS may not receive data (e.g., a padding byte or a MAC PDU including data) from the AMS through UL resources indicated by a predetermined number of UL grants (e.g., 10 UL grants) at steps S803 and S804.

In this case, the ABS transmits the unsolicited AAI_RNG-RSP message to the AMS, such that it can allow the AMS to perform periodic ranging using the periodic ranging code. For this operation, the ABS may set the ranging request bit of the unsolicited AAI_RNG-RSP message to the value of '1' at step S805.

In this case, the ABS may start operating a timer e.g., a retry timer or a T58 timer) that indicates a standby time for reception of the ranging confirmation (AAI_RNG-CFM) message.

Upon receiving the ranging request from the ABS, the AMS may transmit the periodic ranging code to the ABS at step S806.

The ABS transmits the AAI ranging acknowledgement (AAI_RNG-ACK) message as a response to the periodic ranging code at step S807. In this case, the AAI_RNG-ACK message may include not only ranging status information indicating the success or failure of the ranging but also the corresponding ranging code transmitted from the AMS.

The AMS may transmit the AAI_RNG-CFM message as a response to the AAI_RNG-ACK message at step S808. In this case, the AMS may include its own STID and the MCEH wherein the polling bit is set in the AAI_RNG-CFM message.

Upon receiving the AAI_RNG-CFM message from the AMS, the ABS may update the active ABS timer (active_ABS_timer) at step S809. If the polling bit of the MCEH is set in the AAI_RNG-CFM message, the ABS may further transmit the AAI_MSG-ACK message to the AMS. In accordance with the aforementioned process shown in FIG. 8, a PDU for the UL grant allocated from the ABS is not transmitted, but the next message transmission/reception process is described to cause no errors as shown in FIG. 8. However, in reality, transmission/reception error of some messages may occur. In this case, operations of the AMS and the ABS will hereinafter be described with reference to FIG. 9.

Figure 9:
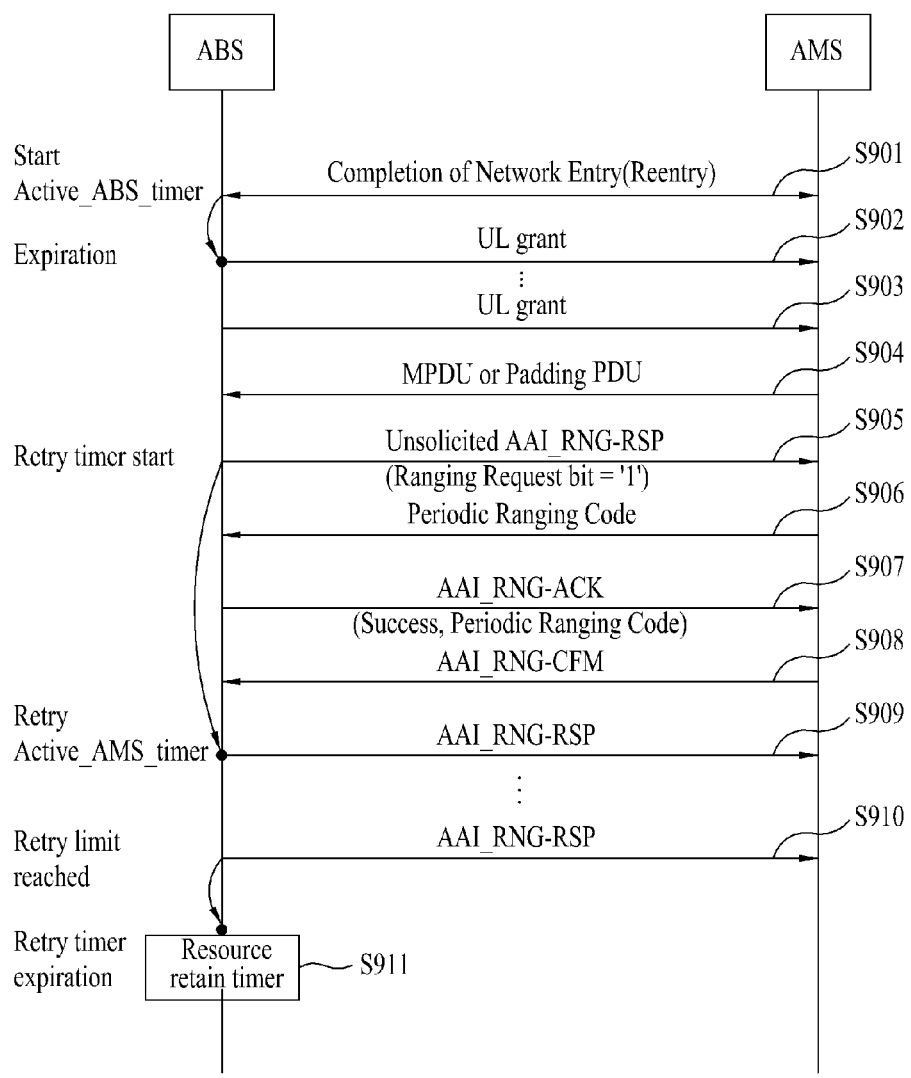
FIG. 9 is a conceptual diagram illustrating AMS and ABS operations performed when erroneous reception occurs in some messages during coverage loss detection according to still another embodiment of the present invention.

FIG. 9 is a conceptual diagram illustrating AMS and ABS operations performed when erroneous reception occurs in some messages during coverage loss detection according to still another embodiment of the present invention.

Referring to FIG. 9, steps S901 to S907 are respectively similar to steps S801 to S807 of FIG. 8, and as such detailed description thereof will herein be omitted for convenience of description.

Although the ABS transmits the AAI_RNG-ACK message to the AMS at step S907, the ABS may not receive the AAI_RNG-CFM message as a response to the AAI_RNG-ACK message at step S908.

If the ABS does not receive the AAI_RNG-CFM message from the AMS prior to the expiration of either the retry timer or the T58 timer that begins to operate when the unsolicited AAI_RNG-RSP message is transmitted at step S905, the ABS retransmits the AAI_RNG-RSP message to the AMS at step S909.

After that, the ABS may transmit the AAI_RNG-RSP message to the AMS a predetermined retry limit number of times at step S910. If the ABS does not continuously receive the AAI_RNG-CFM message from the AMS, the resource retain timer starts operation at step S911. If the predetermined retry limit number of times is not established, the T58 timer expires, such that the ABS may directly start operating the resource retain timer as necessary. If the resource retain timer starts operation, it is preferable that the ABS does not restart operating the active ABS timer (active_ABS_timer).

Meanwhile, differently from FIG. 8 or FIG. 9, the ABS may not transmit the unsolicited AAI_RNG-RSP message to the AMS. In this case, the exemplary case wherein the resource retain timer begins to operate will hereinafter be described with reference to FIG. 10.

Figure 10:
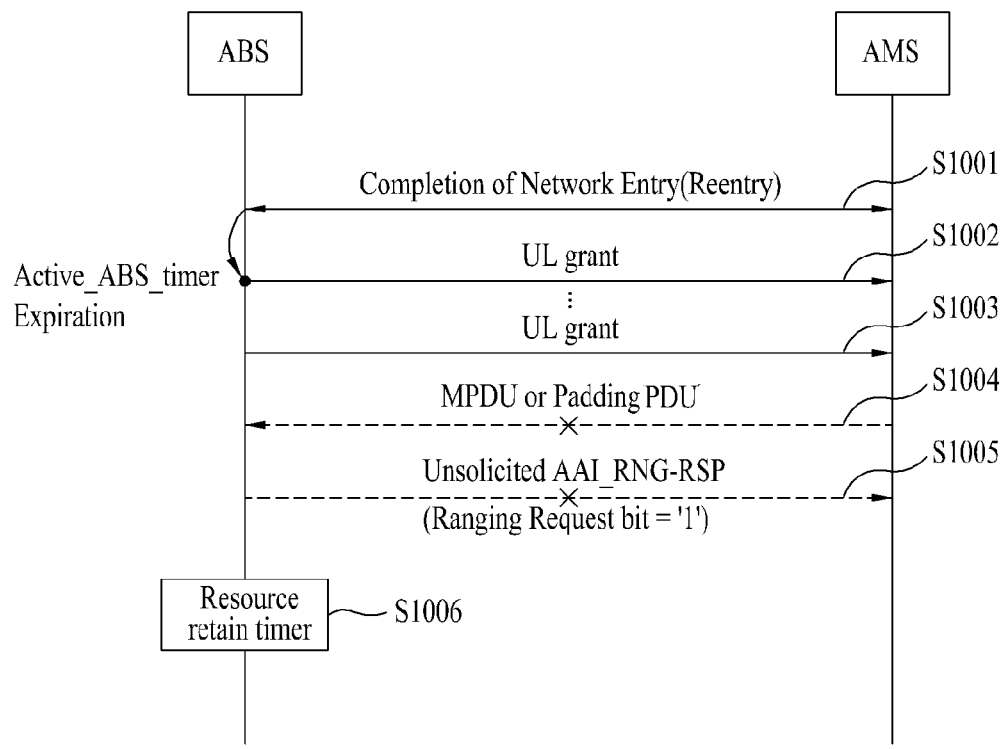
FIG. 10 is a conceptual diagram illustrating another method for detecting coverage loss according to still another embodiment of the present invention.

FIG. 10 is a conceptual diagram illustrating another method for detecting coverage loss according to still another embodiment of the present invention.

Referring to FIG. 10, the same parts as those of FIG. 8 will herein be omitted for convenience of description, and only differences between FIG. 10 and FIG. 8 will hereinafter be described in detail.

As can be seen from FIG. 10, although the AMS does not answer the UL grant allocated from the ABS through an MPDU or a padding PDU at step S1004 and the ABS does not transmit the unsolicited AAI_RNG-RSP message at step S1005, the ABS may start operating the resource retain timer at step S1006.

Hereinafter, operations of the ABS after the beginning of the resource retain timer will hereinafter be described in detail.

Figure 11:
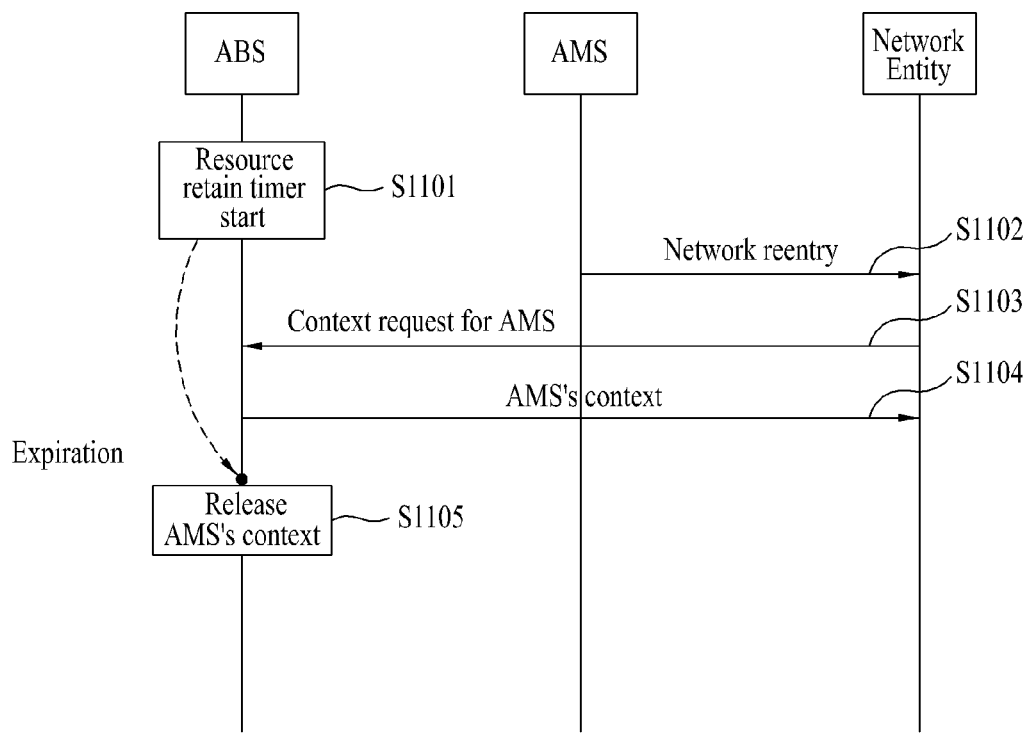
FIG. 11 is a conceptual diagram illustrating operations performed when a resource retain timer is expired and released according to still another embodiment of the present invention.

FIG. 11 is a conceptual diagram illustrating operations performed when a resource retain timer is expired and released according to still another embodiment of the present invention.

It is assumed that FIG. 11 shows the subsequent procedures of FIG. 9 or FIG. 10.

First, the ABS starts operating the resource retain timer according to the coverage loss detection procedure at step S1101.

In this case, the AMS may perform network re-entry to another network entity at step S1102. At this time, the AMS may inform the corresponding network entity of the ABS information (e.g., a base station ID (BSID) of the final serving ABS). In this case, the network entity may be another macro BS, a relay station, or a femto BS.

The corresponding network entity may request AMS context information from the ABS so as to enable the AMS to perform rapid network re-entry at step S1103. The ABS may transmit AMS context information being kept in the ABS to the corresponding network entity over a backbone network at step S1104. Therefore, the ABS may release the resource retain timer and the AMS context information.

Assuming that steps S1102 to S1104 are not performed and the resource retain timer expires, the ABS decides that the corresponding AMS is in coverage loss, such that the ABS can release the AMS context information being kept in the AMS. In more detail, the ABS may release the AMS's dynamic context information, and may move the AMS's static context information to the network entity storing context information of the corresponding AMS.

Meanwhile, the aforementioned coverage loss detection method will hereinafter be described with reference to FIG. 12 from the viewpoint of the AMS operations.

Figure 12:
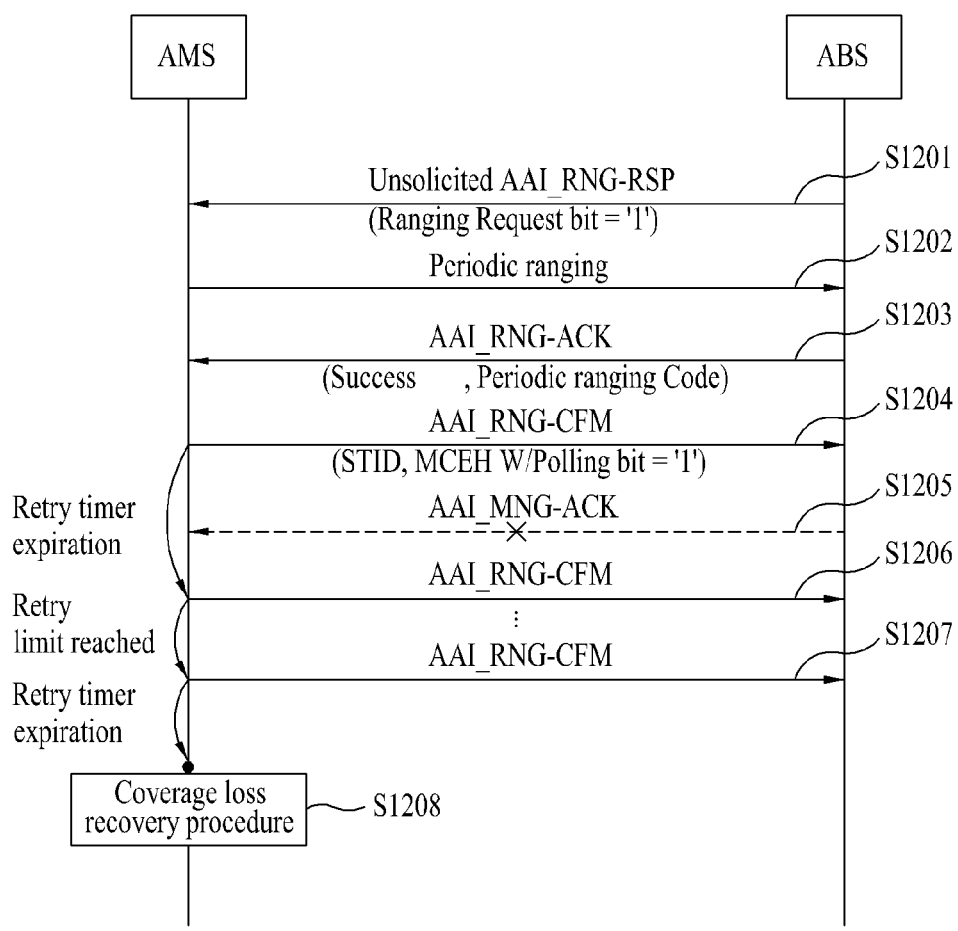
FIG. 12 is a conceptual diagram illustrating a method for detecting coverage loss detection when erroneous transmission of some messages occurs from the viewpoint of an advanced mobile station (AMS) according to still another embodiment of the present invention.

FIG. 12 is a conceptual diagram illustrating a method for detecting coverage loss detection when erroneous transmission of some messages occurs from the viewpoint of an AMS according to still another embodiment of the present invention.

Referring to FIG. 12, steps S1201 to S1204 are respectively similar to steps S805 to S808 of FIG. 8, and as such detailed description thereof will herein be omitted for convenience of description.

In step S1204, the AMS establishes the MCEH's polling bit in the AAI_RNG-CFM message and transmits the resultant AAI_RNG-CFM message, and then expects the AAI_MSG-ACK message from the ABS. However, in step S1205, the AMS may not receive the AAI_RNG-CFM message from the ABS due to the coverage loss, etc., or the AMS may not receive the AAI_MSG-ACK message from the ABS although the ABS has transmitted the AAI_MSG-ACK message.

Prior to the expiration of the retry timer that begins to operate when the AAI_RNG-CFM message is transmitted at step S1204, if the AAI_MSG-ACK message is not received from the ABS, the AMS retransmits the AAI_RNG-CFM message to the ABS at step S1206.

Thereafter, the AMS may transmit the AAI_RNG-CFM message to the ABS a predetermined retry limit number of times at step S1207. In the case where the AMS does not continuously receive the AAI_MSG-ACK message, this means a coverage loss status, such that the AMS may start operating a coverage loss recovery procedure at step S1208.

Meanwhile, the AMS may not establish the polling bit of the MCEH in the AAI_RNG-CFM message. In this case, the success or failure of the AAI_RNG-CFM message may be decided through a hybrid automatic request (HARQ) scheme. Although a number of HARQ transmission times for the AAI_RNG-CFM message is higher than a predetermined maximum number, it can be recognized that the AMS is in coverage loss.

The coverage loss recovery procedure will hereinafter be described with reference to FIG. 13.

Figure 13:
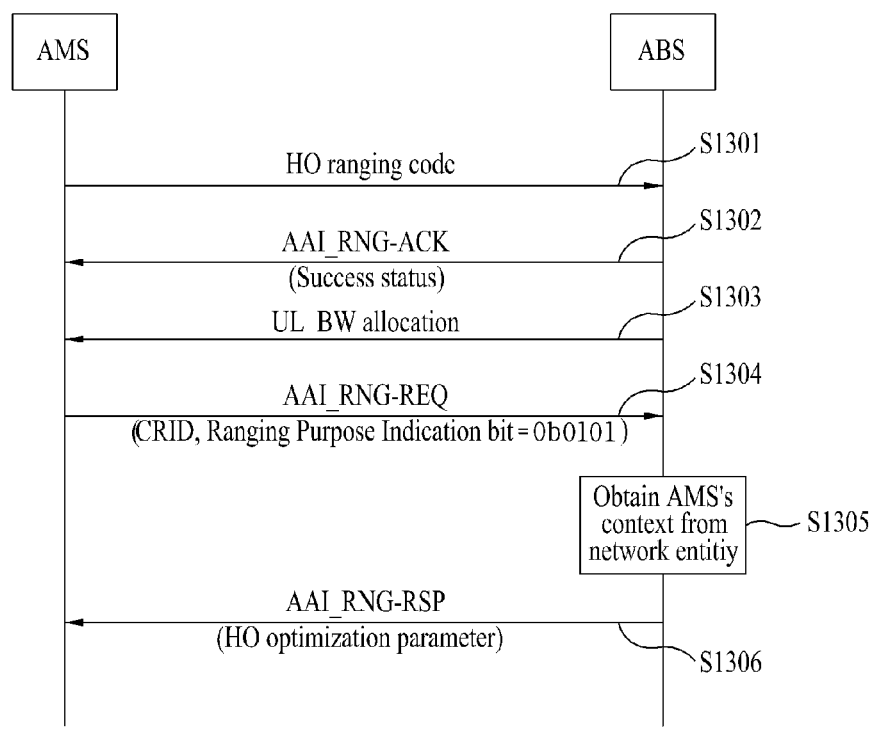
FIG. 13 is a conceptual diagram illustrating a method for allowing an AMS of a coverage loss state to perform network re-entry such that coverage loss recovery is provided according to still another embodiment of the present invention.

FIG. 13 is a conceptual diagram illustrating a method for allowing an AMS of a coverage loss state to perform network re-entry such that coverage loss recovery is provided according to still another embodiment of the present invention.

If the AMS moves out of the coverage area of the ABS, the coverage loss recovery procedure may be carried out by the AMS. In order to achieve the coverage loss recovery procedure, the AMS may scan a new channel to search for the ABS. If the ABS is detected, the AMS may establish PHY synchronization and DL synchronization with the corresponding ABS. In this case, the detected ABS may be identical to or different from the serving ABS that has maintained the last connection status.

Thereafter, the AMS may transmit the HO ranging code to the detected ABS so as to perform network re-entry at step S1301.

The ABS successfully receives the ranging code, sets the AAI_RNG-ACK message to a success status, and transmits the successful AAI_RNG-ACK message to the AMS at step S1302, and allocates a uplink bandwidth (UL BW) to the AMS at step S1303.

After the coverage loss of the AMS, the AMS may transmit the AAI_RNG-REQ message to the ABS through the allocated uplink resources at step S1304. In the AAI_RNG-REQ message, the ranging purpose indicator (i.e., the ranging purpose indication bit) is set to a specific value (e.g., 0b1000) indicating a network reentry after a coverage loss. In this case, the AMS may include the CRID in the AAI_RNG-REQ message. If security context is valid, the AMS shall include its CRID in AAI_RNG-REQ protected with a a cipher-based message authentication code (CMAC) derived from new AK.

The ABS may obtain AMS's context information from the network entity (e.g., Authenticator ASN-GW) that stores context information of the corresponding AMS using the CRID transmitted through the AAI_RNG-REQ message transmitted from the AAI_RNG-REQ message at step S1305.

The ABS decides the MAC control message that can be omitted using the obtained AMS's context, establishes a HO optimization parameter according to the decided MAC control message, and transmits the AAI_RNG-RSP message to the AMS at step S1306.

In this case, the AAI_RNG-RSP message may include a STID for allowing the corresponding ABS to identify the AMS. If the CRID is updated, a new CRID may be further included in the AAI_RNG-RSP message. In addition, if a CMAC value of the AAI_RNG-REQ message transmitted from the AMS is valid, the AAI_RNG-RSP message is encrypted and transmitted to the AMS.

Thereafter, the AMS may perform a network re-entry procedure according to the HO optimization parameter.

If the AMS does not include a ID (serving ABS ID) of the previous serving ABS, if the active AMS timer (active_AMS_timer) expires, or if the resource retain timer expires, the AMS may attempt to perform general initial network re-entry.

Advanced Mobile Station (AMS) and Advanced Base Station (ABS) Structures

Now a description will be given of an AMS and an ABS (i.e., femto BS (FBS) and macro BS (MBS)) for implementing the above-described exemplary embodiments of the present invention, according to another exemplary embodiment of the present invention.

The AMS may operate as a transmitter on an uplink and as a receiver on a downlink, while the BS may operate as a receiver on the uplink and as a transmitter on the downlink. That is, each of the AMS and the ABS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 14.

Figure 14:
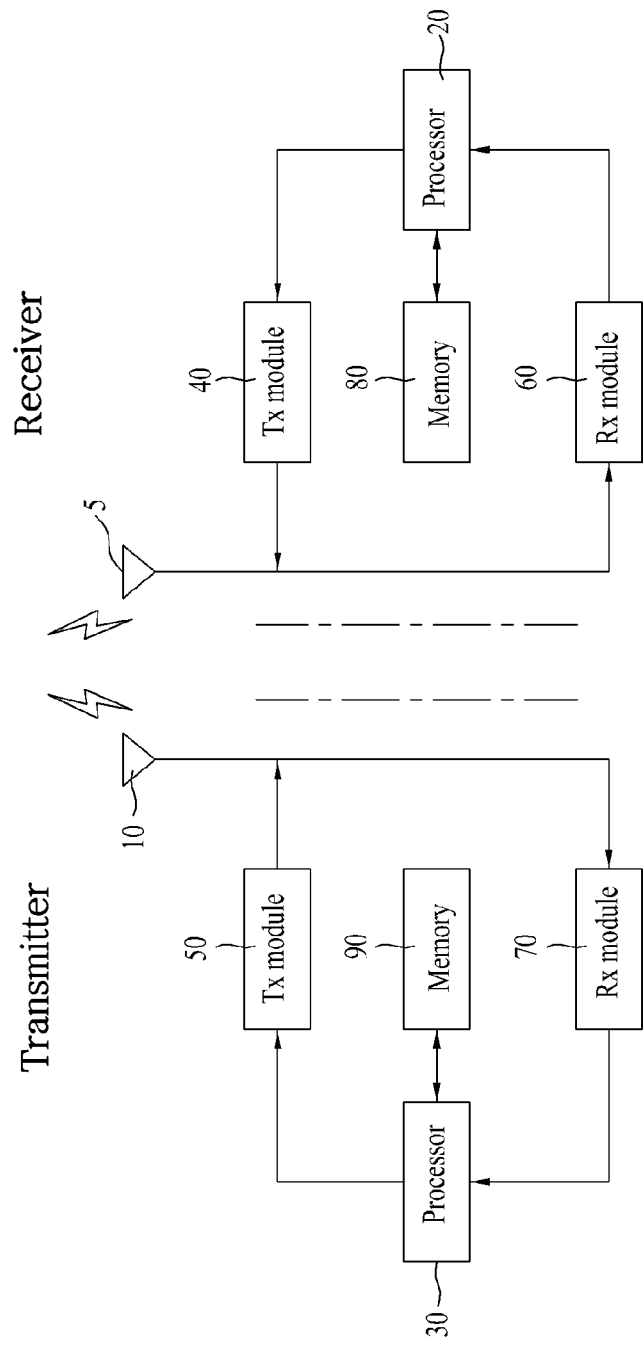
FIG. 14 is a block diagram illustrating a transmitter and a receiver according to another embodiment of the present invention.

FIG. 14 is a block diagram illustrating a transmitter and a receiver according to another embodiment of the present invention.

Referring to FIG. 14, the structures of the transmitter and the receiver are illustrated on the left and right sides of FIG. 14, respectively. Each of the receiver and the transmitter may include an antenna 5 or 10, a processor 20 or 30, a Transmission (Tx) module 40 or 50, a Reception (Rx) module 60 or 70, and a memory 80 or 90. Each component of the transmitter operates in correspondence with its counterpart of the receiver.

The antennas 5 and 10 transmit Radio Frequency (RF) signals generated from the Tx modules 40 and 50 in the air interface, or receive RF signals in the air interface and output the received RF signals to the Rx modules 60 and 70. When Multiple Input Multiple Output (MIMO) is supported, two or more antennas may be used.

An antenna, a Tx module and an Rx module may collectively form an RF module.

The processors 20 and 30 provide overall control to the AMS. For example, the processors 20 and 30 may perform a control function, a MAC frame conversion control function based on service characteristics and propagation environments, a handover (HO) function, and authentication and encryption functions in order to perform the afore-described exemplary embodiments. In more detail, the processors 20 and 30 may provide overall control for the above-mentioned coverage loss detection procedures shown in FIGS. 1 to 13.

Specifically, the processor of the AMS may manage the active AMS timer. Upon receiving the UL grant from the ABS for coverage loss detection, the AMS may transmit a MPDU or padding PDU to the AMS. In addition, if the AMS receives the unsolicited AAI_RNG-RSP message including the ranging request bit from the ABS so as to detect coverage loss, the AMS may perform periodic ranging to the corresponding ABS. In addition, if the ABS informs the AMS of the successful periodic ranging through the AAI_RNG-ACK message during the aforementioned coverage loss detection procedure, the ABS's ID is contained in the AAI_RNG-CFM message, and the resultant AAI_RNG-CFM message may be transmitted to the ABS. If the AMS does not receive a response to the AAI_RNG-CFM message from the ABS prior to the expiration of a predetermined retry timer, the AAI_RNG-ACK message is retransmitted a maximum number of retransmission times. Nevertheless, if the AAI_MSG-ACK message is not received from the ABS, this means the occurrence of coverage loss. If the coverage loss is decided, the processor of the AMS may perform the coverage loss recovery procedure.

The processor of the AMS may provide overall control to the operations shown in the aforementioned embodiments.

The Tx modules 40 and 50 may transmit data scheduled by the processors 20 and 30 to the antennas 5 and 10, after a predetermined coding and modulation.

The Rx modules 60 and 70 may recover original data by decoding and demodulating RF signals received through the antennas 5 and 10 over the air interface and output the original data to the processors 20 and 30.

The memories 80 and 90 may store programs for processing and control of the processors 20 and 30 and temporarily store input/output (I/O) data (e.g., sleep mode information in response to reference synchronization information, and the like). Each of the memories 80 and 90 may include at least one type of storage media such as a flash memory, a hard disk, a multimedia card micro, a card-type memory (e.g. a Secure Digital (SD) or extreme Digital (XD) memory), a Random Access Memory (RAM), a Static Random Access Memory (SRAM), a Read Only Memory (ROM), an Electrically Erasable Programmable Read Only Memory (EEPROM), a Programmable Read Only Memory, a magnetic memory, a magnetic disc, an optical disc, etc.

In the meantime, the advanced base station (ABS) may perform, in at least one of the above-described modules or in a separately procured means, module or part, a control function according to the embodiments of the present invention, an Orthogonal Frequency Division Multiple Access (OFDMA) packet scheduling, Time Division Duplex (TDD) packet scheduling, channel multiplexing, a variable MAC frame control function based on service characteristics and a propagation environment, a real-time high-speed traffic control function, a handover function, an authentication and encryption function, a packet modulation and demodulation function for data transmission, a high-speed packet channel coding function, a real-time modem control function, and the like.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Also, it will be obvious to those skilled in the art that claims that are not explicitly cited in the appended claims may be presented in combination as an exemplary embodiment of the present invention or included as a new claim by subsequent amendment after the application is filed.

As apparent from the above description, the exemplary embodiments of the present invention have the following effects.

First, in the case of using the method for detecting coverage loss according to the embodiments of the present invention, the BS can effectively recognize whether the MS is present in a coverage area of the BS.

Second, in the case of using the method and apparatus for detecting coverage loss according to embodiments of the present invention, the MS can effectively recognize whether the MS is present in a coverage area of the serving base station (SBS), and can effectively perform initial network entry or network re-entry even though the MS moves out of the coverage area of the SBS.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing a coverage loss detection procedure at a base station in a wireless communication system, the method comprising:
    transmitting an unsolicited advanced air interface ranging response (unsolicited AAI-RNG-RSP) message to a mobile station, wherein the unsolicited AAI-RNG-RSP message includes an indicator bit set to '1' to request the mobile station to perform a ranging;
    starting a first timer when the unsolicited AAI-RNG-RSP message is transmitted;
    receiving an advanced air interface ranging confirmation (AAI-RNG-CFM) message including a station identifier (STID) of the mobile station after a successful periodic ranging, the AAI-RNG-CFM message indicating the successful periodic ranging initiated by the unsolicited AAI-RNG-RSP message; and
    starting a second timer if the AAI-RNG-CFM message is not received from the mobile station upon expiration of the first timer, wherein the second timer is related to a retention period of context of the mobile station.

2. The method according to claim 1, further comprising:
    allocating uplink resources to the mobile station a predetermined number of times when a third timer expires, wherein the third timer starts upon completion of an initial network entry,
    wherein the unsolicited AAI-RNG-RSP message is transmitted when an arbitrary protocol data unit (PDU) is not received from the mobile station through the uplink resources during the predetermined number of times.

3. The method according to claim 1, further comprising: releasing a dynamic context of the mobile station when the second timer expires.

4. The method according to claim 1, wherein the first timer is a T58 timer and the second timer is a resource retain timer.

5. The method according to claim 1, wherein the ranging is performed using a periodic ranging code.

6. A base station performing a coverage loss detection procedure in a wireless communication system, the base station comprising:
    a processor; and
    a radio frequency (RF) module for transceiving an RF signal controlled by the processor,
    wherein the processor is configured to:
        cause the RF module to transmit an unsolicited advanced air interface ranging response (unsolicited AAI-RNG-RSP) message to a mobile station, wherein the unsolicited AAI-RNG-RSP message includes an indicator bit set to '1' to request the mobile station to perform a ranging;
        start a first timer when the unsolicited AAI-RNG-RSP message is transmitted;
        cause the RF module to receive an advanced air interface ranging confirmation (AAI-RNG-CFM) message including a station identifier (STID) of the mobile station after a successful periodic ranging, the AAI-RNG-CFM message indicating the successful periodic ranging initiated by the unsolicited AAI-RNG-RSP message; and
        start a second timer if the AAI-RNG-CFM message is not received from the mobile station upon expiration of the first timer, wherein the second timer is related to a retention period of context of the mobile station.

7. The base station according to claim 6, wherein the processor is further configured to allocate uplink resources to the mobile station a predetermined number of times when a third timer expires, wherein the third timer starts upon completion of an initial network entry, wherein the unsolicited AAI-RNG-RSP message is transmitted when an arbitrary protocol data unit (PDU) is not received from the mobile station through the uplink resources during the predetermined number of times.

8. The base station according to claim 6, wherein the processor is further configured to release a dynamic context of the mobile station when the second timer expires.

9. The base station according to claim 6, wherein the first timer is a T58 timer and the second timer is a resource retain timer.

10. The base station according to claim 6, wherein the ranging is performed using a periodic ranging code.

* * * * *